US012211398B2

(12) United States Patent
Warren et al.

(10) Patent No.: US 12,211,398 B2
(45) Date of Patent: Jan. 28, 2025

(54) METHODS AND SYSTEMS FOR SIMULATED OPERATION OF AN ELECTRIC AIRCRAFT

(71) Applicant: BETA AIR LLC, South Burlington, VT (US)

(72) Inventors: Nicholas Granger Warren, Burlington, VT (US); Charles C. Guthrie, Burlington, VT (US); Nicholas Moy, Burlington, VT (US); Alexander Hoekje List, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/200,235

(22) Filed: May 22, 2023

(65) Prior Publication Data
US 2023/0298480 A1 Sep. 21, 2023

Related U.S. Application Data

(63) Continuation of application No. 17/348,916, filed on Jun. 16, 2021, now Pat. No. 11,694,570.

(51) Int. Cl.
G09B 9/16 (2006.01)
G06T 19/00 (2011.01)
(Continued)

(52) U.S. Cl.
CPC ............ G09B 9/165 (2013.01); G06T 19/006 (2013.01); G09B 9/206 (2013.01); G09B 9/24 (2013.01)

(58) Field of Classification Search
CPC . G09B 9/00; G09B 9/006; G09B 9/06; G09B 9/16; G09B 9/165; G09B 9/206;
(Continued)

(56) References Cited

U.S. PATENT DOCUMENTS 5,616,030 A  4/1997 Watson
8,864,497 B1  10/2014 Pollak et al.
(Continued)

FOREIGN PATENT DOCUMENTS

WO 2018191730 A1 10/2018

OTHER PUBLICATIONS

Xie, "Digital Twin Technologies for Turbomachinery in a Life Cycle Perspective: A Review", Feb. 25, 2021, 5 pages.
(Continued)

Primary Examiner — Timothy A Musselman
(74) Attorney, Agent, or Firm — Brake Hughes Bellermann LLP

(57) ABSTRACT

Aspects relate to augmented reality (AR) methods and systems for simulated operation of an electric vertical takeoff and landing (eVTOL) aircraft. An exemplary AR system includes at least an aircraft component of an eVTOL aircraft, a computing device configured to operate a flight simulator to simulate flight in an environment and simulate at least a virtual representation interactive with the flight simulator, where the at least a virtual representation includes an aircraft digital twin of the at least an aircraft component, and a mesh network configured to communicatively connect the at least an aircraft component and the computing device and communicate encrypted data.

20 Claims, 11 Drawing Sheets

(51) Int. Cl.
*G09B 9/20* (2006.01)
*G09B 9/24* (2006.01)

(58) Field of Classification Search
CPC ... G09B 9/24; G09B 9/44; G09B 9/46; G09B 9/48; G06T 19/00; G06T 19/006; G06N 3/08
See application file for complete search history.

(56) References Cited

U.S. PATENT DOCUMENTS

| | | |
|---|---|---|
| 9,558,672 B2 | 1/2017 | McCann et al. |
| 10,155,373 B2 | 12/2018 | Nino et al. |
| 10,318,904 B2 | 6/2019 | Johnson et al. |
| 10,431,005 B2 | 10/2019 | Parfenov et al. |
| 10,847,038 B2 | 11/2020 | Yousif et al. |
| 11,042,673 B1 | 6/2021 | Mclean et al. |
| 2017/0294135 A1 | 10/2017 | Lechner |
| 2018/0362190 A1 | 12/2018 | Chambers et al. |
| 2019/0146470 A1 | 5/2019 | Akkaram et al. |
| 2020/0050256 A1 | 2/2020 | Yamamoto et al. |
| 2021/0049925 A1 | 2/2021 | Robinson et al. |
| 2021/0125515 A1 | 4/2021 | Mikic et al. |
| 2021/0245893 A1 | 8/2021 | Yuksel et al. |
| 2021/0284196 A1 | 9/2021 | Sorensen et al. |

OTHER PUBLICATIONS

Madni, "Leveraging Digital Twin Technology in Model-Based Ssytems Engineering", Jan. 30, 2019, 27 pages.
Tuegel, "Reengineering Aircraft Structural Life Prediction Using a Digital Twin", Oct. 23, 2011, 23 pages.

METHODS AND SYSTEMS FOR SIMULATED OPERATION OF AN ELECTRIC AIRCRAFT

CROSS-REFERENCE TO RELATED APPLICATIONS

This application is a continuation of Non-provisional application Ser. No. 17/348,916 filed on Jun. 16, 2021 and entitled "METHODS AND SYSTEMS FOR SIMULATED OPERATION OF AN ELECTRIC VERTICAL TAKE-OFF AND LANDING (EVTOL) AIRCRAFT," the entirety of which is incorporated herein by reference.

FIELD OF THE INVENTION

The present invention generally relates to the field of computer modeling and simulation. In particular, the present invention is directed to simulated operation of an electric vertical take-off and landing (eVTOL) aircraft.

BACKGROUND

Aircraft simulators may aid in training, maintenance, and testing of aircraft. The functionality of aircraft simulators may be limited by their accuracy of representation for aircraft.

SUMMARY OF THE DISCLOSURE

In an aspect an augmented reality (AR) system for simulated operation of an electric vertical take-off and landing (eVTOL) aircraft includes at least an aircraft component of an electric vertical take-off and landing (eVTOL) aircraft, a computing device configured to operate a flight simulator to simulate flight in an environment and simulate at least a virtual representation interactive with the flight simulator, where the at least a virtual representation includes an aircraft digital twin of the at least an aircraft component, and a mesh network configured to communicatively connect the at least an aircraft component and the computing device and communicate encrypted data.

In another aspect an augmented reality (AR) method of simulated operation of an electric vertical take-off and landing (eVTOL) aircraft includes operating, using a device computing, a flight simulator to simulate flight in an environment, simulating, using the computing device, at least a virtual representation interactive with the flight simulator, where the at least a virtual representation includes an aircraft digital twin representing at least an aircraft component of an electric vertical take-off and landing (eVTOL) aircraft, communicatively connecting, using a mesh network, the at least an aircraft component and the computing device, and communicating, using the mesh network, encrypted data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for simulated operation of an electric vertical take-off and landing (eVTOL) aircraft. In an embodiment, a digital twin may be used to represent at least an aircraft component of an eVTOL aircraft.

Aspects of the present disclosure can be used to maintain and use a digital twin in conjunction with a flight simulator and/or a simulator module. Aspects of the present disclosure can also be used to communicate aircraft and/or simulation data between at least a digital twin and at least an aircraft component and vice versa. This is so, at least in part, to ensure accuracy of aircraft simulation for training, testing, and maintenance purposes.

Aspects of the present disclosure allow for simulated operation of an eVTOL aircraft, as well as simulated maintenance and testing of an eVTOL aircraft. Exemplary embodiments illustrating aspects of the present disclosure are described below in the context of several specific examples.

Figure 1:
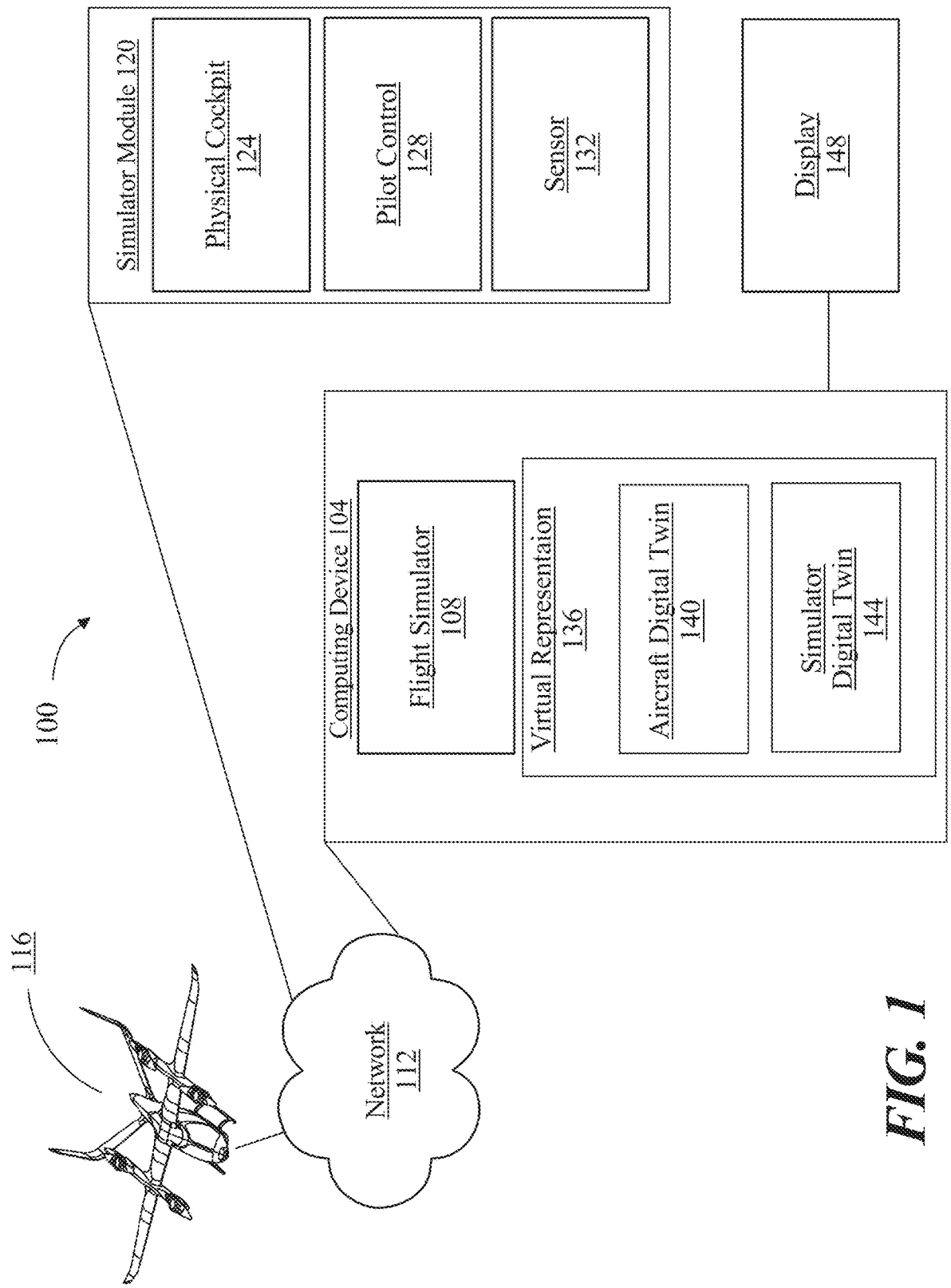
FIG. 1 is a block diagram of an exemplary system for wrapping simulated intra-aircraft communication to a physical controller area network.

Referring now to FIG. 1, an exemplary embodiment of an augmented reality (AR) system 100 for simulated operation of an electric vertical take-off and landing (eVTOL) aircraft is shown. System 100 includes a computing device 104. As used in this disclosure, "augmented reality" refers to any technology used to alter, add-to, remove, supplant, or otherwise modify a perceived realty, for instance of a user; accordingly, augmented reality may include mixed reality and/or virtual reality. In some cases, augmented reality may include visual and/or auditory stimuli. Alternatively or additionally, augmented reality may include non-visual modalities, for example haptic somata sensory and olfactory. In some cases, augmented reality may include virtual reality and/or mixed reality visual modality and one or more physical aircraft elements, to emulate a flight environment and/or functional aircraft. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may be configured to operate a flight simulator 108. As used in this disclosure, a "flight simulator" is a program or set of operations that simulate flight. In some cases, a flight simulator may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. In some cases, a flight simulator 108 may model an artificial and/or virtual aircraft in flight as well as an environment in which the artificial and/or virtual aircraft flies. In some cases, a flight simulator 108 may include one or more physics models, which represent analytically or through data-based, such as without limitation machine-learning processes, physical phenomenon. Physical phenomenon may be associated with an aircraft and/or an environment. For example, some versions of a flight simulator 108 may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator 108 may include models representing fluid dynamics. For example, in some embodiments, flight simulator may include a representation of turbulence, wind shear, air density, cloud, precipitation, and the like. In some embodiments, flight simulator 108 may include at least a model representing optical phenomenon. For example, flight simulator may include optical models representative of transmission, reflectance, occlusion, absorption, attenuation, and scatter. Flight simulator 108 may include non-analytical modeling methods; for example, the flight simulator may include, without limitation, a Monte Carlo model for simulating optical scatter within a turbid medium, for example clouds. In some embodiments, a flight simulator 108 may represent Newtonian physics, for example motion, pressures, forces, moments, and the like. An exemplary flight simulator may include Microsoft Flight Simulator from Microsoft of Redmond, Washington, U.S.A.

With continued reference to FIG. 1, system 100 may include a network 112. Network may include any network described in this disclosure, for example without limitation an avionic mesh network as described below. Network 112 may facilitate communicative connection between two or more devices. "Communicatively connected", for the purposes of this disclosure, is a process whereby one device, component, or circuit is able to receive data from and/or transmit data to another device, component, or circuit; communicative connection may be performed by wired or wireless electronic communication, either directly or by way of one or more intervening devices or components. In an embodiment, communicative connection includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, optical coupling, or the like. In some cases, network 112 may include a mesh network. In some cases, network 112 may communicated encrypted data. As used in this disclosure, "encrypted data" is any communicable information that is protected or secured by any method, including obfuscation, encryption, and the like. Encrypted data may include information protected by any cryptographic method described in this disclosure, for example in reference to FIG. 7. In some embodiments, network 112 may include an intra-aircraft network and/or an inter-aircraft network. Intra-aircraft network may include any intra-aircraft network described in this disclosure. Inter-aircraft network may include any inter-aircraft network described in this disclosure.

With continued reference to FIG. 1, network 112 may be communicatively connected to at least an aircraft component 116. As used in this disclosure, an "aircraft component" is any component of an aircraft, for example an electric vertical and take-off (eVTOL) aircraft. In some embodiments, an aircraft component may include, without limitation, any of a flight component, a pilot input, a pilot display, a sensor, an actuator, a flight surface, an inverter, and a motor. An exemplary aircraft component 116 may include an integrated electric propulsion unit. Disclosure related to systems and methods of use for integrated electric propulsion units include U.S. patent application Ser. No. 16/703,225 entitled "INTEGRATED ELECTRIC PROPULSION ASSEMBLY," incorporated herein by reference in its entirety. Aircraft component 116 may be configured to receive a simulated signal from at least a controller area network, for example by way of a port. In some embodiments, at least a controller area network may include a controller area network bus and/or a plurality of controller area network buses. In some embodiments, aircraft component 116 may be configured to respond to the simulated signal. In some cases, computing device 104 and at least an aircraft component 116 may be configured to communicate by way of network 112. For example, in some cases, computing device 104 may be configured to transmit encrypted data to at least an aircraft component 116. Alternatively or additionally, in some cases, computing device 104 may be configured to receive encrypted data from at least an aircraft component 116.

With continued reference to FIG. 1, in some embodiments, system 100 may additionally include a simulator module 120. Simulator module 120 may be communicatively connected to computing device 104 by any communication means described in this disclosure, for example without limitation network 112. As used in this disclosure, a "simulator module" is a physical component that is a simulation of an aircraft component. Simulator module may include actual aircraft components that have been separated from a functioning aircraft or otherwise de-activated. A simulator module may include a model or replica. In some cases, simulator module may include a physical twin of at least an aircraft component. In some cases, simulator module may include a physical cockpit 124. A physical cockpit 124 may include at least an aircraft component. For example, a physical cockpit 124 may include one or more of an aircraft interior, seating, windows, displays, pilot controls, and the like. A physical cockpit 124 may be used to perform a simulated flight mission. As used in this disclosure, a "simulated flight mission" is any use of a flight simulator 108 that includes a simulated flight. Simulator module 120 and/or physical cockpit 124 may include at least a pilot control 128 configured to interface with a user. Pilot control 128 may include any pilot control described in this disclosure. In some cases, at least one of simulator module 120, physical cockpit 124, and pilot control 128 may include at least a sensor 132. At least a sensor 132 may be communicatively connected to computing device 104. In some cases, at least a sensor 132 may be configured to detect a user interaction with the at least a pilot control 128. At least a sensor 132 may include any sensor described in this disclosure.

With continued reference to FIG. 1, computing device may be configured to simulate at least a virtual representation 136. As described in this disclosure, a "virtual representation" includes any model or simulation accessible by computing device which is representative of a physical phenomenon, for example without limitation at least an aircraft component 116 or simulator module 120. In some cases, virtual representation may be interactive with flight simulator 108. For example, in some cases, data may originate from virtual representation and be input into flight simulator 108. Alternatively or additionally, in some cases, virtual representation 136 may modify or transform data already available to flight simulator 108. Virtual representation 136 may include an aircraft digital twin 140 of at least an aircraft component 116. Aircraft digital twin 140 may include any digital twin as described in this disclosure, for example below. In some cases, at least an aircraft component 116 includes an electric vertical take-off and landing (eVTOL) aircraft, for example a functional flight-worthy eVTOL aircraft; and aircraft digital twin 140 is a digital twin of the eVTOL aircraft. In some cases, at least a virtual representation 136 may include a virtual controller area network. Virtual controller area network may include any virtual controller area network as described in this disclosure, for example below. In some cases, aircraft digital twin may include a flight controller model. Flight controller model may include any flight controller model described in this disclosure.

Still referring to FIG. 1, in some embodiments, virtual representation 136 may additionally include a simulator digital twin 144. Simulation digital twin may include any digital twin as described in this disclosure, for example below. Simulator digital twin 144 may represent at least a portion of simulator module 120, for instance at least a component of simulator module 120, such as without limitation, physical cockpit 124, pilot control 128, and at least a sensor 132. In some cases, network 112 may be additionally configured to communicatively connect simulator module 120 with at least an aircraft component 116 and computing device 104.

With continued reference to FIG. 1, in some embodiments, at least an aircraft component may be communicatively connected using at least a controller area network. At least a controller area network may include a plurality of physical controller area network buses communicatively connected to the aircraft, such as an electronic vertical take-off and landing (eVTOL) aircraft as described in further detail below. A physical controller area network bus may be vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. A plurality of physical CAN bus units located physically at the aircraft may include mechanical connection to the aircraft, wherein the hardware of the physical CAN bus unit is integrated within the infrastructure of the aircraft. Physical CAN bus units may be communicatively connected to the aircraft and/or with a plurality of devices outside of the aircraft, as described in further detail below.

Still referring to FIG. 1, a plurality of physical CAN bus units communicatively connected to an aircraft may include flight controller(s), battery terminals, gyroscope, accelerometer, proportional-integral-derivative controller, and the like, which may communicate directly with one another and to operating flight control devices, virtual machines, and other computing devices elsewhere. Physical CAN bus units may be mechanically connected to each other within an aircraft wherein physical infrastructure of the device is integrated into the aircraft for control and operation of various devices within the aircraft. Physical CAN bus unit may be communicatively connected with each other and/or to one or more other devices, such as via a CAN gateway. Communicatively connecting may include direct electrical wiring, such as is done within automobiles and aircraft. Communicatively connecting may include infrastructure for receiving and/or transmitting transmission signals, such as with sending and propagating an analogue or digital signal using wired, optical, and/or wireless electromagnetic transmission medium.

Continuing in reference to FIG. 1, a plurality of physical CAN bus units communicatively connected to aircraft may receive pilot input. Pilot input may include input using a throttle lever, inceptor stick, collective pitch control, steering wheel, brake pedals, pedal controls, toggles, joystick. One of ordinary skill in the art, upon receiving the benefit of this disclosure in its entirety, may appreciate the variety of pilot input controls that may be present in an electric aircraft consistent with the present disclosure. For instance and without limitation, inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. In further non-limiting illustrative examples, a collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Pilot control 128 may be physically located within the aircraft or located remotely outside the aircraft in a second location communicatively connected to at least a portion of the aircraft.

Continuing in in reference to FIG. 1, each physical CAN bus unit may be configured to detect a measured state datum of a plurality of measured state data of aircraft. A "measured state datum," as used in this disclosure, is a datum that is collected via a CAN describing some functionality about aircraft. Measured state data may include a plurality of data signals detailing a control to one or more actuators communicatively connected to the aircraft. Measured state data may include a plurality of data entries relating aircraft pitch, roll, yaw, torque, angular velocity, climb, speed, performance, lift, thrust, drag, battery charge, fuel level, location, and the like. Measured state data may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptor, throttle, collective, cyclic, yaw pedals, MFDs, PFDs, and the like. Measured state data may exist as analogue and/or digital data, originating from physical CAN bus units such as bits, where a series of serial binary data are composed and transmitted relaying a measured state as indicated from a device located within, on, or communicating with aircraft.

With continued reference to FIG. 1, at least an aircraft component 116 may transmit a signal using network 112 to computing device 104. Signal may be received by computing device 104. Computing device 104 may convert signal to aircraft data for inputting to flight simulator 108 and/or virtual representation 136. Computing device 104 may input aircraft data to flight simulator 108 and/or virtual representation 136. In some embodiments, at least an aircraft component 116 may include at least a sensor. A sensor may include any sensor described herein, for example without limitation an inertial measurement sensor, an analog sensor, a digital sensor, a thermometer, a pressure sensor, a humidity sensor, and the like. In some cases, sensor may be configured to sense a characteristic associated with an aircraft flight and transduce a signal as a function of the characteristic. An aircraft flight may include any flight of an aircraft, for instance an eVTOL aircraft. In some embodiments, at least an aircraft component 116 may include at least a pilot control. Pilot control may be any pilot control described in this disclosure, for example below.

Continuing in reference to FIG. 1, a physical CAN bus unit may be communicatively connected to an actuator. For example, CAN may be connected to at least an aircraft component 116 that comprises an actuator. An "actuator," as used in this disclosure, is a device which receives control signals in an aircraft. Actuator may be communicatively connected to CAN. Actuator may include a computing device or plurality of computing devices consistent with the entirety of this disclosure. Actuator may be designed and/or configured to perform any method, method step, or sequence of method steps in any embodiment described in this disclosure, in any order and with any degree of repetition. For instance, actuator may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Actuator may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, computing device 104 may additionally include or be configured to perform operations functioning a virtual controller area network. In some cases, a virtual controller area network may be usefully considered as a component of aircraft simulator 108 and/or virtual representation 136. Alternatively or additionally, virtual controller area network may be considered distinct from aircraft simulator; for example, virtual controller area network may be considered an interpreter of aircraft simulator 108 into a virtual communication protocol analogous to that of a controller area network. In some cases a virtual CAN may include at least a virtual controller area network bus unit configured to receive a transmission signal originating from at least a network switch. A virtual controller area network bus unit may be a device including a central processing unit (CPU), CAN controller, and transceiver, which receives a transmission signal and virtually recapitulates a message encoded within the signal, wherein the message may include without limitation a status, behavior, and/or data of and/or originating from CAN. Virtual CAN bus unit may include any physical circuit elements suitable for use in a physical CAN bus unit as described above. Virtual CAN bus unit may include a multiplexor, multiplexing logic, and/or multiplex electrical wiring for transmission of multiplexed signaling. In some cases, virtual CAN bus may be communicative with a network switch. Virtual CAN bus unit may include message-based protocol(s), wherein the invoking program sends a message to a process and relies on that process and its supporting infrastructure to then select and run appropriate programing. Virtual CAN bus unit may include a computing device, as described in further detail below. Virtual CAN bus unit may include a computer, "smartphone", IoT device, tablet computer, among other devices with capability described herein. Virtual CAN bus unit may receive a transmission signal. Virtual CAN bus unit may receive a transmission signal as an ethernet transmission signal and/or RF transmission signal. Virtual CAN bus unit may include a virtual machine, which operates as an emulation of a computer system, providing functionality of a physical computer. Virtual CAN bus unit may include any device herein configured to demultiplex signal, store to disc, transmit signals to other device, and/or send back to flight CAN(s).

Continuing in reference to FIG. 1, virtual CAN bus unit may be configured to demultiplex an incoming transmission signal into a plurality of outgoing messages originating from the plurality of physical controller area network buses. An outgoing message may be a demultiplexed transmission signal which originated as part of an incoming transmission signal. Outgoing message may include a plurality of data, and/or discrete portions thereof. Outgoing message may include analogue and/or digital transmission signals, including ethernet transmission signal and/or RF transmission signal. Demultiplexing may include processes of reconverting a transmission signal containing, for example containing multiple analogue and/or digital signal streams from at least an aircraft component 116, computing device 104, and/or simulator module 120, back into original separate and unrelated signals originally relayed from controller area network. Demultiplexing may include extracting original channels on a receiving end to identify which physical CAN bus unit a signal originates from. Demultiplexing may be performed using a demultiplexer such as a binary decoder, or any programmable logic device. Demultiplexing may be performed using a computing software operating on the virtual CAN bus unit, which may deconvolute a signal. Alternatively or additionally, virtual CAN bus unit may be configured to communicatively connect to each controller area network gateway of a plurality of controller area network gateways. Virtual CAN bus unit may receive signal transduction directly from CAN network gateways, circumventing the need for multiplexing.

Continuing in reference to FIG. 1, a virtual CAN bus unit may be configured to bridge a plurality of virtual controller area network bus units to a plurality of physical controller area network bus units. A plurality of virtual controller area network bus units may include at least a second virtual CAN bus unit aside from a first virtual CAN bus unit which originally received a transmission signal. The plurality of virtual controller area network bus units may include any capability as described for virtual CAN bus unit herein. A network bridge may include a computer networking device (e.g., virtual CAN bus unit) that creates a single, aggregate network from multiple communication networks or network segments (e.g., plurality of virtual CAN buses). Network bridging is distinct from routing. Routing may allow multiple networks to communicate independently and yet remain separate, whereas bridging may connect two separate networks as if they were a single network. In this way, a virtual CAN bus unit may transmit a demultiplexed outgoing messages to a plurality of virtual CAN bus units which may operate as if they were all part of a single virtual machine. Bridging may include any type of network bridging technology, such as simple bridging, multiport bridging, and learning or transparent bridging. Virtual CAN bus unit may perform bridging using a forwarding information base stored in content-addressable memory (CAM), wherein for each received ethernet frame, virtual CAN bus unit may learn from the frame's source MAC address and add this together with an interface identifier. Virtual CAN bus unit may then forward frame to an interface found on the CAN based on the frame's destination MAC address. If the destination address is unknown, switch may send frame out on all interfaces (except an ingress interface). This process is oftentimes referred to unicast flooding. Once a bridge learns the addresses of its connected nodes, it may forward data link layer frames using a layer-2 forwarding method. There are several forwarding methods a bridge can use, for instance and without limitation, store and forward, cut through, fragment free, and adaptive switching, of which some methods are performance-increasing methods when used on "switch" products with the same input and output port bandwidths.

Continuing in reference to FIG. 1, bridging may include using any device that is capable for communicating with a virtual CAN bus unit, computing device, or able to receive data, retrieve data, store data, and/or transmit data, for instance via a data network technology such as 3G, 4G/LTE, 5G, Wi-Fi, IEEE 802.11 family standards, IEEE 802.1aq standards, and the like. For instance and without limitation, Shortest Path Bridging (SPB), specified in the IEEE 802.1aq standard, is a computer networking technology intended to simplify the creation and configuration of networks, while enabling multipath routing. It may include a proposed replacement for Spanning Tree Protocol (SPB) which blocks any redundant paths that could result in a layer 2 loop. SPB may allow all paths to be active with multiple equal-cost paths. SPB may also increase the number of VLANs allowed on a layer-2 network. Bridging between devices may also include devices that communicate using other mobile communication technologies, or any combination thereof, for instance and without limitation, short-range wireless communication for instance, using Bluetooth and/or Bluetooth LE standards, AirDrop, near-field (NFC), and the like. Bridging between devices may be performed using any wired, optical, or wireless electromagnetic transmission medium, as described herein.

Continuing in reference to FIG. 1, bridging a plurality of virtual controller area network bus units to at least a controller area network may include transmitting at least a control message of a plurality of control messages originating from at least a virtual controller network bus of the plurality of virtual controller network buses to the at least a CAN. A control message may include a transmission signal that is intended to control a device that is communicative by way of at least a CAN. A control message may include an output message originating from computing device 104 for modulating an aspect of flight control via a device communicatively connected to at least a CAN. Control message may enable a virtual machine, such as virtual CAN bus unit, computing device 104, and/or any device described herein, to propagate a transmission targeted to at least an aircraft component 116 to effect, actuate, and/or modulate an aircraft mechanism. Control message may include a transmission signal to alter fly-by-wire control, flight control, thrust, angular velocity, climb, altitude, pitch, yaw, roll, acceleration, braking, landing gear mechanism, among other flight controls. Control message may include analogue or digital transmission signals intended to be displayed to and/or for a pilot operating aircraft. Control message may include digital messages intended to be displayed via a heads-up device (HUD), touch screen, computer, or other digital messaging intended to be displayed in the aircraft. Control message may include transmitted signals intended to operate a payload associated with aircraft, for instance for releasing a mechanism for dropping a cargo load. Control message may be propagated and transmitted from virtual buses using an analogue and/or digital signal via a wired, optical, and/or wireless electromagnetic medium (such as via an ethernet connection, radio frequency, or any other electromagnetic signal transmission). Continuing in reference to FIG. 1, bridging performed by computing device 104, simulator module 120, and/or virtual CAN bus unit may include transmitting at least a control message to control at least an aircraft component 116. As described herein, actuators may receive signals, such as control message, for controlling a device communicatively connected with aircraft. Control message, for instance and without limitation, may signal actuator to control thruster controls, landing gear, inceptor, throttle, collective, cyclic, impeller, alerion, rotors, motor, flight display, gyroscope, accelerometer, sensor/sensor suite, fault detection system, inertial measure unit (IMU), power management system, air conditioning/heat, among other flight controls, displays, and/or devices. Control message may be received by all systems communicative with at least a CAN demultiplexed and bridged to computing device 104, at least an aircraft component 116, and the like. Control message may originate from any device which is bridged via virtual CAN bus unit, for example computing device 104 and/or flight simulator 108. Additionally disclosure related to virtual and physical CAN buses is detailed in U.S. patent application Ser. No. 17/218,342 entitled "METHOD AND SYSTEM FOR VIRTUALIZING A PLURALITY OF CONTROLLER AREA NETWORK BUS UNITS COMMUNICATIVELY CONNECTED TO AN AIRCRAFT," by J. Auerbach et al., which is incorporated herein by reference in its entirety.

With continued reference to FIG. 1, system 100 may include a display 148 communicatively connected to computing device 104. In some cases, display 148 may be configured to display at least a virtual representation 136. In some cases, display 148 may be configured to display at least a graphical element of flight simulator 108. Display 148 may include any display technology known in the art, including those for instance disclosed with reference to FIG. 11. In some embodiments, display 148 may include a plurality of displays and may be configured to display imagery that is immersive to a user. For example, in some cases, display 148 may include a curved screen or set of screens that cover a field of vision. In some embodiments, display 148 may be configured to display a field of vision extending peripherally to cover some or all of the field of vision possible from a cockpit of an aircraft. In some cases, display 148 may include an Omnimax or Imax screen. In some cases, display 148 may include a projector, for example red, green, blue, (RGB) projectors and the like. In some cases, display 148 may include multiple screens, which may be joined together to form a larger screen with various possible geometric configurations. In some cases, display 148 may include multiple projectors. In some cases, display 148 may include circuitry, hardware, firmware, and/or software to coordinate image display using multiple screens/projectors. For example, circuitry, hardware, firmware, and/or software may be configured to overlap display zones or views from multiple displays, screens, projectors, and the like.

With continued reference to FIG. 1, in some cases, display 148 may include a stereoscopic display. A "stereoscopic display" as used in this disclosure, is a display 148 that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display 148 may display two flat images having different perspectives, each to only one eye (i.e., parallax), which may simulate the appearance of an object or space as seen from the perspective of that eye. Alternatively or additionally, stereoscopic display 148 may include a three-dimensional display 148 such as a holographic display 148 or the like. In some embodiments, display 148 may include an autostereoscopic display. In some cases, an autostereoscopic display may include a single screen that projects two or more views, which are relayed to different eyes of a viewer, for example without limitation by way of lenticular lenses. In some cases, an autostereoscopic display may include adaptive optics elements, such as adaptive lenticular lenses using indium tin oxide electrodes and a liquid crystal cell, to adjust optical properties of the lenticular lens according to a sensed position of a user's eyes. In some cases, an eye-tracking system, for example a system including an eye-tracking camera, may be used to determine a location of a user's eyes (e.g., pupils) relative a display 148 and adjust adaptive optics and display parameters accordingly. In some cases, an autostereoscopic display may project multiple views for multiple pairs of eyes, such that different views are viewable from different locations relative display 148. In some exemplary cases, an autostereoscopic display having a static lenticular lens screen may project 7 different views. Persons skilled in the art, upon reviewing the entirety of this disclosure, will be aware of various alternative or additional types of stereoscopic display 148 that may be employed in the augmented reality system. In some cases, display 148 may include a display usable with a headset, for example an augmented reality or virtual reality headset. For example, in some cases, display 148 may include a liquid crystal display and/or a heads-up display. Headset may include a screen that displays a field of vision to user. System 100 may include a projection device, defined as a device that inserts images into field of vision. Projection device may include a software and/or hardware component that adds inserted images into a display 148 signal to be rendered on the display 148. Projection device and/or display may make use of reflective waveguides, diffractive waveguides, or the like to transmit, project, and/or display images. For instance, and without limitation, projection device and/or display 148 may project images through and/or reflect images off an eyeglass-like structure and/or lens piece, where either both field of vision and images from projection device may be so displayed, or the former may be permitted to pass through a transparent surface. Projection device and/or display 148 may be incorporated in a contact lens or eye tap device, which may introduce images into light entering an eye to cause display of such images. Projection device and/or display 148 may display some images using a virtual retina display 132 (VRD), which may display an image directly on a retina of user.

Figure 2:
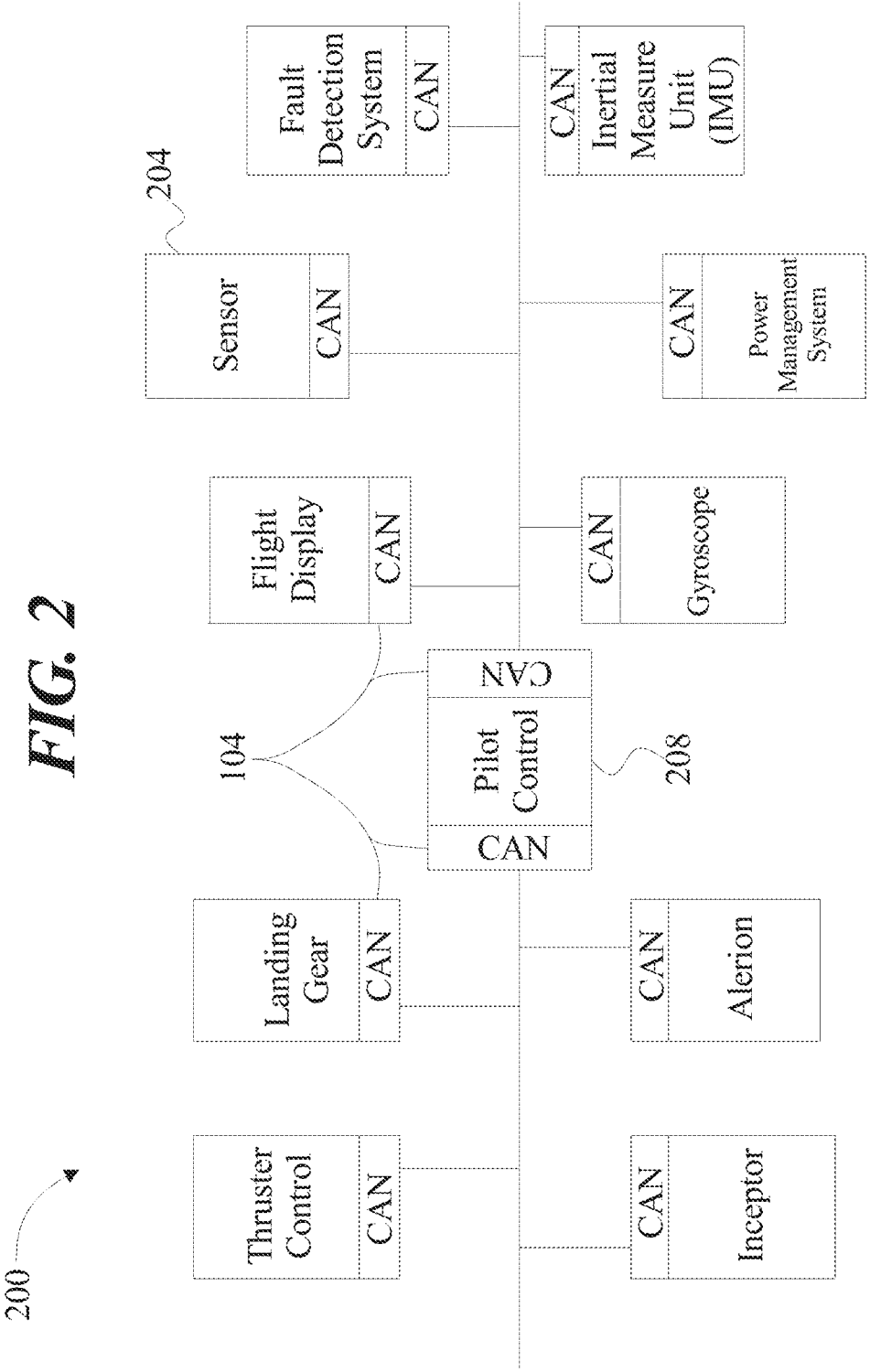
FIG. 2 is a diagrammatic representation illustrating a plurality of physical controller area network buses.

Referring now to FIG. 2, a non-limiting exemplary embodiment 200 of a plurality of physical controller area network buses are illustrated. CAN may be used to prevent the need for large, multi-core wiring harnesses used in eVTOL aircraft. CAN bus speed my may reach 1 Mbit/sec, which may be achieved with a bus length of up to 40 meters when using a twisted wire pair. The bus must be terminated at each end, typically using a resistor of 120 Ohms. For bus lengths longer than 40 meters the bus speed must be reduced, for instance, 1000-meter bus may be achieved with a 50 Kbit/sec bus speed. Aircraft may include a plurality of sensors that connect with physical CAN bus units layers to transmit signals. For instance and without limitation physical CAN bus units may transmit a signal from at least a sensor 204 communicatively connected to at least a pilot control 208. A signal originating from sensor may include electrical, electromagnetic, visual, audio, radio waves, or another undisclosed signal type alone or in combination. At least a sensor 204 communicatively connected to at least a pilot control 208 may include a sensor disposed on, near, around or within at least pilot control 208. At least a sensor 204 may include a motion sensor. A "motion sensor", for the purposes of this disclosure, is a device or component configured to detect physical movement of an object or grouping of objects. One of ordinary skill in the art would appreciate, after reviewing the entirety of this disclosure, that motion may include a plurality of types including and not limited to: spinning, rotating, oscillating, gyrating, jumping, sliding, reciprocating, or the like. At least a sensor 204 may include, torque sensor, gyroscope, accelerometer, torque sensor, magnetometer, inertial measurement unit (IMU), pressure sensor, force sensor, proximity sensor, displacement sensor, vibration sensor, Hall sensor, among others.

Still referring to FIG. 2, sensor 204 may include a sensor suite which may include a plurality of sensors 204 that may detect similar or unique phenomena. For example, in a non-limiting embodiments, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors 204 may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor 204 is configured to detect pilot input from at least pilot control 208. At least pilot control 208 may include a throttle lever, inceptor stick, collective pitch control, steering wheel, brake pedals, pedal controls, toggles, joystick. In some cases, at least a pilot control 208 may include one or more components as described in documents that are incorporated by reference in this disclosure.

Continuing in reference to FIG. 2, sensor 204 may be configured to receive a command datum. A "command datum", as used in this disclosure, refers an electronic signal representing at least an element of data correlated to a desired change in aircraft conditions as described in the entirety of this disclosure. A command datum may include any communication comprising instructions, data interpretable as instructions, or data readily convertible to instructions for at least a flight component. A command datum may originate from pilot input, in a case of manual flight controls. Alternatively or additionally, in some cases, a command signal may originate from or represent an output from an autonomous function or mode of a flight controller. In some cases, a command signal may originate from or represent a command from at least a remote device, for example a ground crew system. At least pilot control 208 may be communicatively connected to any other component presented in system, the communicative connection may include redundant connections configured to safeguard against single-point failure. A signal, such as without limitation a command datum, may signal a change to the heading or trim of an electric aircraft. The signal may signal a change to an aircraft's pitch, roll, yaw, or throttle. Command datum, when referring to throttle, may refer to a signal to increase or decrease thrust produced by at least a propulsor. Command datum may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, and/or pulse width modulated signal, among others. At least a sensor 204 may include circuitry, computing devices, electronic components, such as CAN, or a combination of elements, that translates control message into at least an electronic signal command datum configured to be control an electronic component.

Figure 3:
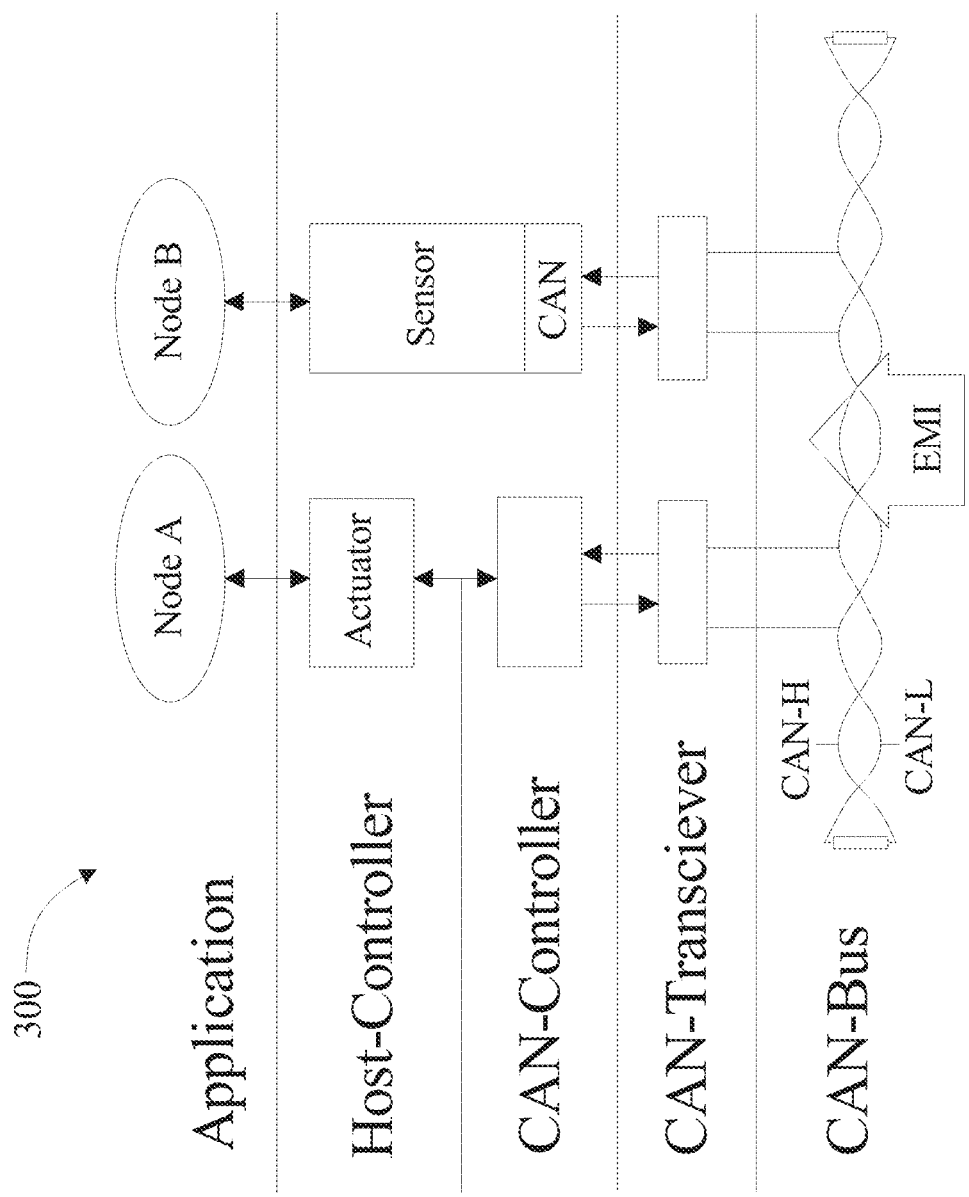
FIG. 3 is a diagrammatic representation illustrating a transmission signal from a controller area network.

Referring now to FIG. 3, a non-limiting exemplary embodiment 300 of a CAN bus architecture and resultant transmission signal is illustrated. The CAN bus may include a balanced (differential) 2-wire interface running over either a Shielded Twisted Pair (STP), Un-shielded Twisted Pair (UTP), or Ribbon cable. Each node may use a male 9-pin D connector. The CAN protocol, which may perform on physical CAN bus including a CPU, controller, and/or transceiver, may use Non-Return-to-Zero, or NRZ, bit coding for signal transmission. This means that the signal is constant for one whole bit time and only one time segment is needed to represent one bit. The two bus conductors may be simply referred to as "CAN H" and "CAN L", although the conductors may be driven differentially in balanced mode, the levels are shifted, resulting in a waveform that differs. NRZ encoding (with bit-stuffing) for data communication may rely on a differential two wire bus. The use of NRZ encoding ensures compact messages with a minimum number of transitions and high resilience to external disturbance.

Figure 4:
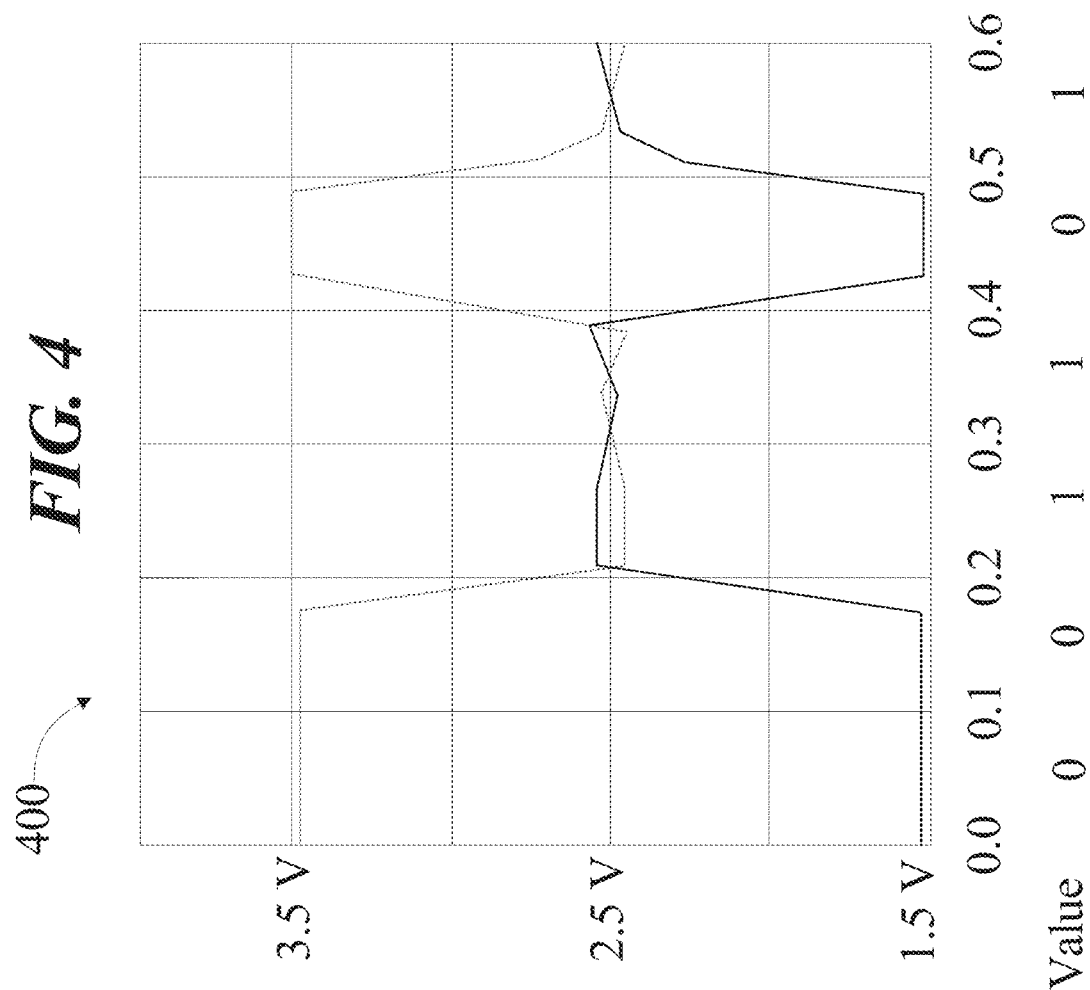
FIG. 4 is a graphical representation illustrating a controller area network signal transduction.

Referring now to FIG. 4, a non-limiting exemplary embodiment 400 of controller area network signal transduction is illustrated. CAN signaling may be represented in 1 and 0 binary sequence wherein the logic refers to 1 (recessive) where no signal is sent (logic 0 wins). For instance, transceiver output at CAN L may float upwards from 1.5 V to 2.5V, and transceiver output at CAN H may float downwards from 3.5 V to 2.5V; in other words, there may be no voltage difference, and/or a negligible voltage difference, between CAN L and CAN H. In such an example, the voltage between the two CAN L and CAN H centers at 2.5 V, which may correspond to either a '0' binary value (bit), or alternatively a '1' binary value. Logic 0 (dominant) may force bus to a zero level, for instance, transceiver output at CAN L may be driven back to 1.5V (or kept at a nominal 1.5 V value), and transceiver output at CAN H may be driven back to 3.5V (or kept at a nominal 3.5 V value) (i.e. there is a 2V voltage difference). Voltage may be read, collected, and/or measured at time intervals of 0.1 microseconds (μs), wherein value relates to the logic bit (0 or 1) that results from each 0.1 μs period. As shown in FIG. 4, an example waveform showing transmission of the sequence {001101} is illustrated. Vertical axis is volts, horizontal axis is microseconds. Alternatively or additionally, a logic level, or finite number of states a digital signal can inhabit, may be represented by any difference in voltage between a signal and a ground. For example, CAN L may be kept at a ground state of 0 V and CAN H may be kept at a nominal 0 V state, where a difference in voltage between the two equals 0 (i.e. no deviation from ground state) and a binary value is transmitted as '0'. Correspondingly, if CAN H voltage rises above 0 V, for instance to 1.5 V, (i.e. a difference in voltage between the two is detected), then the binary value may be transmitted as '1'. Differences in voltage may be sampled at any suitable time point, such as microsecond time scale as depicted in FIG. 4.

Figure 5:
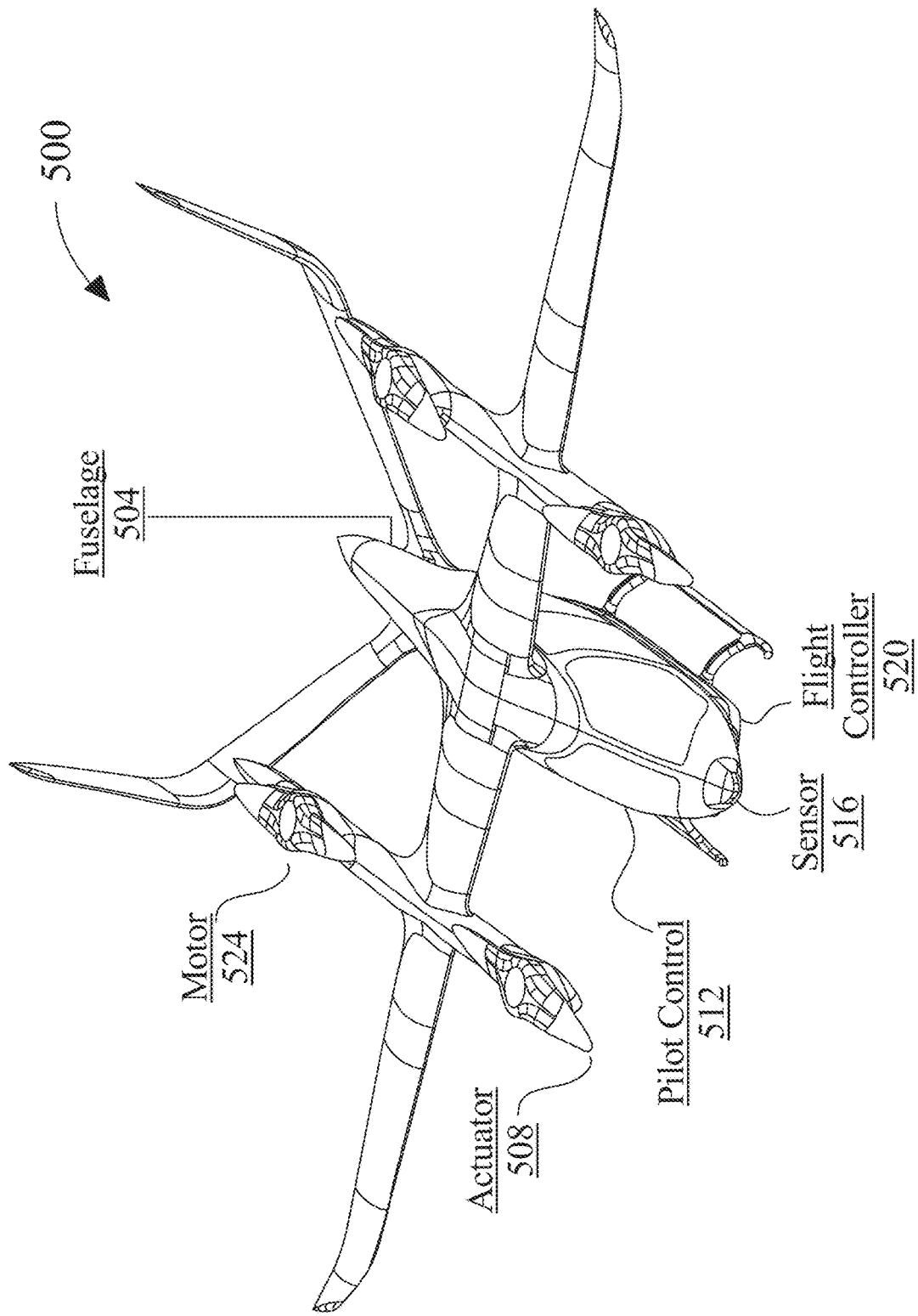
FIG. 5 is a diagrammatic representation of an electric aircraft.

Referring now to FIG. 5, an exemplary embodiment of an aircraft 500 is illustrated. Aircraft 500 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. At least an aircraft component may include any element of aircraft 500, including without limitation fuselage 504, actuator 508, pilot control 512, sensor 516, flight controller 520, and motor 524.

Still referring to FIG. 5, aircraft 500 may include a fuselage 504. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 504 may comprise structural elements that physically support the shape and structure of an aircraft. Structural elements may take a plurality of forms, alone or in combination with other types. Structural elements may vary depending on the construction type of aircraft and specifically, the fuselage. Fuselage 504 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 5, aircraft 500 may include a plurality of actuators 508. Actuator 508 may include any actuator described in this disclosure, for instance in reference to FIGS. 1-4 and 6-7. In an embodiment, actuator 508 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 5, a plurality of actuators 508 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 508 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 508 may include a rudder, which may include, without limitation, a segmented rudder that produces a torque about a vertical axis. Additionally or alternatively, plurality of actuators 508 may include other flight control surfaces such as propulsors, rotating flight controls, or any other structural features which can adjust movement of aircraft 500. Plurality of actuators 508 may include one or more rotors, turbines, ducted fans, paddle wheels, and/or other components configured to propel a vehicle through a fluid medium including, but not limited to air.

Still referring to FIG. 5, plurality of actuators 508 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 5, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 5, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 5, plurality of actuators 508 may include power sources, control links to one or more elements, fuses, and/or mechanical couplings used to drive and/or control any other flight component. Plurality of actuators 508 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 5, plurality of actuators 508 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 5, an energy source may be used to provide a steady supply of electrical power to a load over a flight by an electric aircraft 500. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 5, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 5, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 5, another exemplary actuator may include landing gear. Landing gear may be used for take-off and/or landing/Landing gear may be used to contact ground while aircraft 500 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 5, aircraft 500 may include a pilot control 552, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 508. For example and without limitation, collective control may alter and/or adjust the pitch angle of all of the main rotor blades collectively. For example, and without limitation pilot control 512 may include a yoke control. As used in this disclosure a "yoke control" is a mechanical control of an aircraft to control the pitch and/or roll. For example and without limitation, yoke control may alter and/or adjust the roll angle of aircraft 500 as a function of controlling and/or maneuvering ailerons. In an embodiment, pilot control 512 may include one or more foot-brakes, control sticks, pedals, throttle levels, and the like thereof. In another embodiment, and without limitation, pilot control 512 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 500 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 500 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 5, pilot control 512 may be configured to modify a variable pitch angle. For example, and without limitation, pilot control 512 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 512 may modify the variable pitch angle from a first angle of 2.71° to a second angle of 3.82°. Additionally or alternatively, pilot control 512 may be configured to translate a pilot desired torque for a flight component. For example, and without limitation, pilot control 512 may translate that a pilot's desired torque for a propeller be 160 lb. ft. of torque. As a further non-limiting example, pilot control 512 may introduce a pilot's desired torque for a propulsor to be 290 lb. ft. of torque. Additional disclosure related to pilot control 512 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 5, aircraft 500 may include a loading system. A loading system may include a system configured to load an aircraft of either cargo or personnel. For instance, some exemplary loading systems may include a swing nose, which is configured to swing the nose of aircraft 500 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 5, aircraft 500 may include a sensor 516. Sensor 516 may include any sensor described in this disclosure, for instance in reference to FIGS. 1-4 and FIGS. 6-7. Sensor 516 may be configured to sense a characteristic of an aircraft, an aircraft component, an environment, a pilot, or any phenomenon associated with aircraft 500. Sensor may be a device, module, and/or subsystem, utilizing any hardware, software, and/or any combination thereof to sense a characteristic and/or changes thereof, in an instant environment, for instance without limitation an aircraft component, which the sensor is proximal to or otherwise in a sensed communication with, and transmit information associated with the characteristic, for instance without limitation digitized data. Sensor 516 may be mechanically and/or communicatively coupled to aircraft 500, including, for instance, to at least a pilot control 512. Sensor 516 may be configured to sense a characteristic associated with at least a pilot control 512. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 516 may include at least a geospatial sensor. Sensor 516 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 500 for both critical and non-critical functions. Sensor may be incorporated into vehicle or aircraft or be remote.

Still referring to FIG. 5, in some embodiments, sensor 516 may be configured to sense a characteristic associated with any aircraft component described in this disclosure. Non-limiting examples of a sensor 516 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 516 may sense a characteristic as an analog measurement, for instance, yielding a continuously variable electrical potential indicative of the sensed characteristic. In these cases, sensor 516 may additionally comprise an analog to digital converter (ADC) as well as any additionally circuitry, such as without limitation a Whetstone bridge, an amplifier, a filter, and the like. For instance, in some cases, sensor 516 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 500, for instance without limitation a computing system, a pilot display, and a memory component. Alternatively or additionally, sensor 516 may sense a characteristic of a pilot control 512 digitally. For instance in some embodiments, sensor 516 may sense a characteristic through a digital means or digitize a sensed signal natively. In some cases, for example, sensor 516 may include a rotational encoder and be configured to sense a rotational position of a pilot control; in this case, the rotational encoder digitally may sense rotational "clicks" by any known method, such as without limitation magnetically, optically, and the like.

Still referring to FIG. 5, electric aircraft 500 may include at least a motor 524, which may be mounted on a structural feature of the aircraft. Design of motor 524 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 524 may include two main holes in top and bottom of mounting area to access bearing cartridge. Further, a structural feature may include a component of electric aircraft 500. For example, and without limitation structural feature may be any portion of a vehicle incorporating motor 524, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor. Persons skilled in the art, upon reviewing the entirety of this disclosure, will be aware of various materials, combinations of materials, and/or constructions techniques.

Still referring to FIG. 5, electric aircraft 500 may include a vertical takeoff and landing aircraft (eVTOL). As used herein, a "vertical take-off and landing (VTOL) aircraft" is one that can hover, take off, and land vertically. An "eVTOL," as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, baggage, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce the weight of components of electric aircraft 500, including without limitation propulsors and/or propulsion assemblies. In an embodiment, motor 524 may eliminate a need for many external structural features that otherwise might be needed to join one component to another component. Motor 524 may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Figure 6:
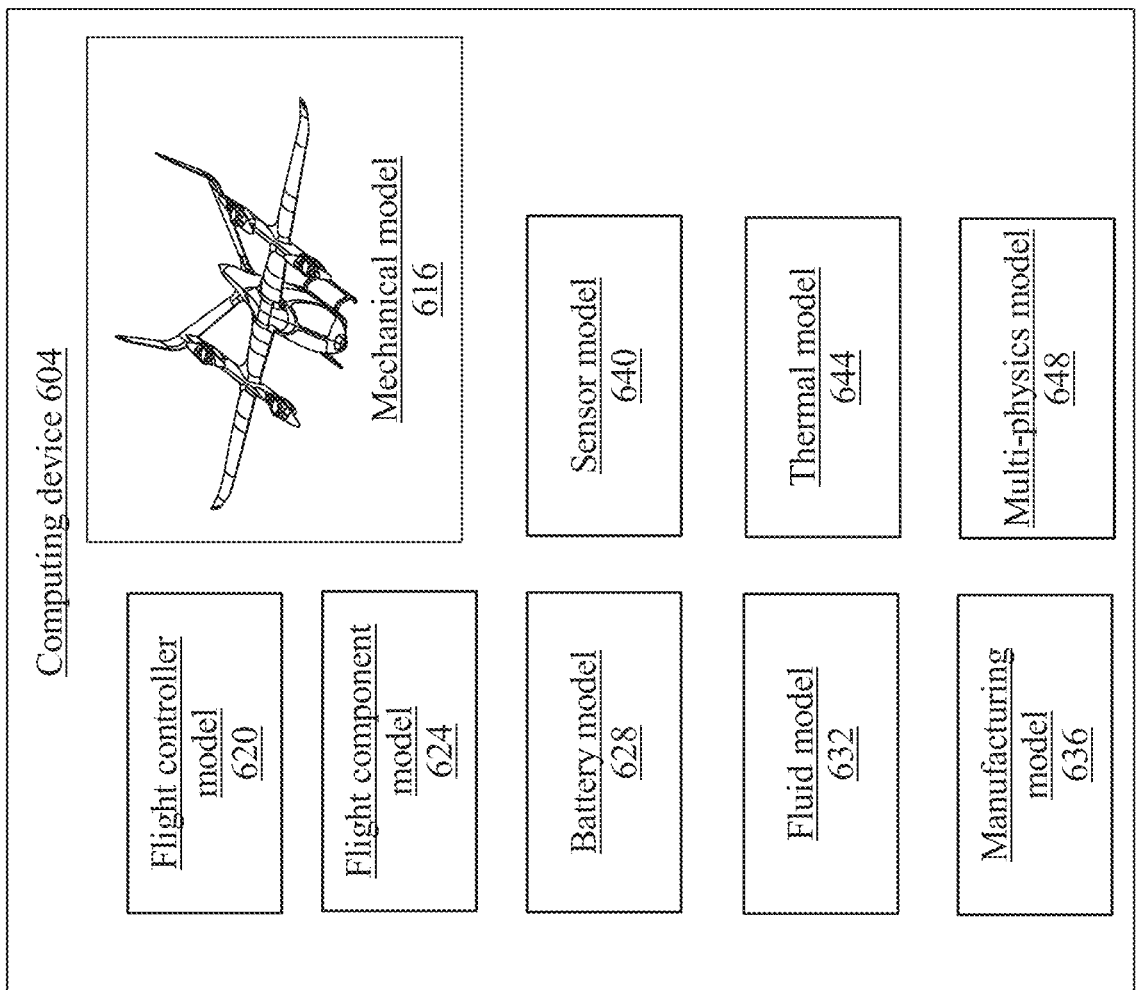
FIG. 6 is a block diagram of an exemplary digital twin for an eVTOL aircraft.
Figure 6:
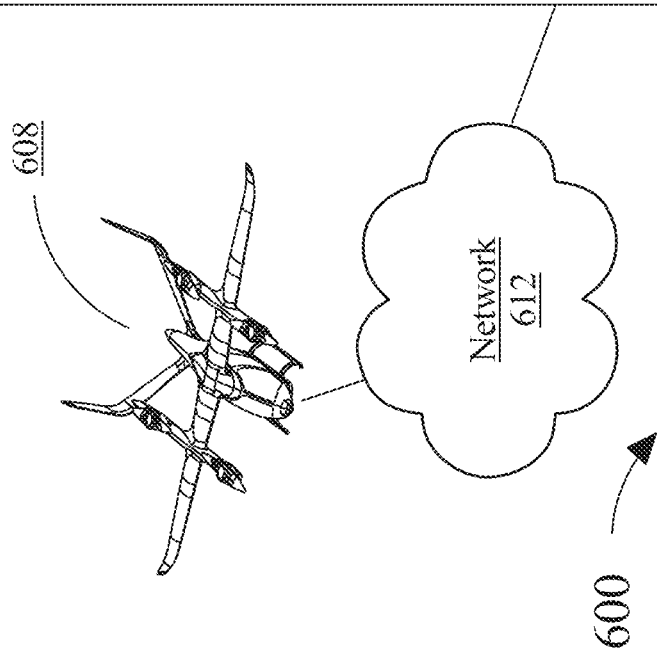

Referring to FIG. 6, an exemplary digital twin 600 is schematically illustrated. digital twin 600 may include a computing device 604. As used in this disclosure, a "digital twin" is an up-to-date virtual representation of a physical component or process, for instance and without limitation an aircraft such as an eVTOL aircraft. Digital twin 600 may represent an aircraft 608. In some cases, aircraft 608 may include an individual aircraft. Alternatively or additionally, in some cases, digital twin 600 may represent a class, type, lot, or aggregate of aircraft 608. In some cases, digital twin 600 may represent an aircraft which is incomplete, or in a pre-production design stage. In some cases, digital twin 600 may represent aircraft 608 which are in use. In some cases, a digital twin may include any of a digital twin prototype (DTP), a digital twin instance (DTI), and a digital twin aggregate (DTA). DTP consists of designs, analyses, and processes to realize a physical component. In some cases, a DTP exists before there is a physical component. DTI is digital twin of any of an individual instance of component, for instance after the component has been manufactured. DTA is an aggregation of DTIs whose data and information can be used for interrogation about a physical component, prognostics, and learning. In some embodiments, specific information contained in digital twin 600 may be driven by use cases. Digital twin 600 may be a logical construct, meaning that actual data and information constituting the digital twin 600 may be contained in any number of other computer devices and/or software. A digital twin 600 may include an integrated multi-physics, multiscale, probabilistic simulation of an as-built vehicle or system that uses best available physical models, sensor updates, fleet history, and the like, to mirror an eVTOL or at least an aircraft component. In some cases, digital twin 600 may be a virtual instance of an aircraft 608 (twin) that is continually updated with the aircraft's performance, maintenance, and health status data, for example throughout the aircraft's life cycle.

With continued reference to FIG. 6, in some cases, digital twin 600 may include a at least a network 612 communicatively connecting at least an aircraft component of aircraft 608 and computing device 604. At least a network 612 may include any network described in this disclosure, including without limitation an avionic mesh network. Computing device 604 may likewise include any computing device described in this disclosure. Digital twin 600 may include any number of models, simulations, digital representations, and the like. Computing device 604 may access, process and/or store some or all models constituting digital twin 600.

With continued reference to FIG. 6, in some embodiments digital twin 600 may include a mechanical model 616 of aircraft 608. Mechanical model 616 may include, for example without limitation, computer-aided design (CAD) models, 3D models, 2D models, material models, finite element analysis (FEA) models, manufacturing models, Stress/vibrational/spectral analysis models, and the like.

With continued reference to FIG. 6, in some embodiments digital twin 600 may include a flight controller model 620. Flight controller model 620 may include a logical model of any controller, processor, or computing device operative on or in service to function of aircraft 608. For example, flight controller model 620 may model any flight controller system or subsystem described in this disclosure. In some cases, modeling of an integrated circuit of flight controller may include hardware emulation. For example, an integrated circuit may be modeled by an emulator configured to emulate an integrated circuit, controller hardware/firmware, FPGA gate arrangement, and the like. In some cases, electronic design automation (EDA) may be used to model at least a portion of flight controller model 620. Additionally non-limiting exemplary electronic circuit simulation and modeling methods include transistor simulation, logic simulation, behavioral simulation, technology CAD, electromagnetic field solvers, and the like. In some cases, flight controller model 620 may be configured to allow for functional verification of at least a portion of a flight controller. In some cases, digital twin 600 may model at least a portion and/or all computing devices within or utilized by an aircraft 608. electrical vertical take-off and landing vehicles may require many computing devices, not only in-flight controllers, but also for function of other flight components.

With continued reference to FIG. 6, in some embodiments, digital twin 600 may include flight component model 624. In some cases, flight component model 624 may be configured to model at least a flight component associated with aircraft. Flight component may include any flight component described in this disclosure.

With continued reference to FIG. 6, in some embodiments, digital twin 600 may include a battery model 628. Battery model 628 may include any model related to at least property, characteristic, or function of a battery located within aircraft. In some cases, battery model 628 may include a model of a battery controller, management, and/or monitoring system. Disclosure related to battery management for eVTOL aircraft may be found in patent application Ser. No. 17/108,798 and Ser. No. 17/111,002, entitled "PACK LEVEL BATTERY MANAGEMENT SYSTEM" and "ELECTRICAL DISTRIBUTION MONITORING SYSTEM FOR AN ELECTRIC AIRCRAFT," respectively, each of which is incorporated herein by reference in its entirety. In some cases, a battery model 628 may include an electrochemical model of battery, which may be predictive of energy efficiencies and heat generation and transfer of at least a battery. In some cases, a battery model 628 may be configured to predict battery lifetime, given known battery parameters, for example measured battery performance, temperature, utilization, and the like.

With continued reference to FIG. 6, in some embodiments, digital twin 600 may include a fluid model 632. A fluid model 632 may model fluids within and/or interacting with aircraft, for example environmental air. In some cases, fluid model may include computation fluid dynamic modeling. Exemplary computation fluid dynamics modeling software includes Ansys Fluids from Ansys of Canonsburg, Pennsylvania, U.S.A.

With continued reference to FIG. 6, in some embodiments, digital twin 600 may include a manufacturing model 636. In some cases, a manufacturing model may include representations of an actual manufacturing process for example for an individual aircraft 608. In some cases, manufacturing model 636 may include reference to an aircraft history file, manufacturing records, and/or maintenance records. For example, in some cases, deviations for a standard manufacturing and/or maintenance process may be included in a manufacturing model 636. In some case, a manufacturing model may include information related to traceability of at least an aircraft component, for example manufacturer, model, and lot number for given critical aircraft components.

With continued reference to FIG. 6, in some embodiments, digital twin 600 may include a sensor model 640. A sensor model 640 may model at least a sensor of aircraft 608. Sensor may include any sensor described in this disclosure. In some cases, sensor model 640 may emulate and/or simulate expected measurements for at least a sensor on aircraft 608. Alternatively and/or additionally in some embodiments, sensor model 640 may be informed by actual measurements communicated at least a sensor of aircraft 608. In some cases, a difference between an expected measurement and an actual measurement may be found, for example by sensor model 640; the difference may be used to improve digital twin 600 performance, for example trough data-based model updating and/or recalibration. In some cases, sensor model 640 may be used to sense, detect, or otherwise measure performance of any other model of digital twin 600 or aircraft 608.

With continued reference to FIG. 6, in some embodiments, digital twin 600 may include a thermal model 644. Exemplary thermal modeling software includes without limitation COMSOL from COMSOL, Inc. of Burlington, Massachusetts, U.S.A. Thermal modeling may include analytical model, for example finite-elemental analysis based upon Fourier conduction, Newton's law of Cooling, and/or Kirchhoff's law of thermal radiation.

With continued reference to FIG. 6, in some embodiments, digital twin 600 may include a multi-physics model 648. A multi-physics model 648 may include analytical models of any well-known or otherwise predictable physical phenomenon. In some cases, a multi-physics model 648 may include elements or portions of any other model described in this disclosure. A multi-physics model 648 may, for example, include electromagnetic radiation models. A multi-physics model may predict optical and/or electrical performance of one or more aircraft components. Multi-physics modeling may include coupled processes or systems involving more than one simultaneously occurring physical field. A multi-physics model may include many physical models. A multi-physics model may include partial differential equations and/or tensor analysis. A multi-physics model may include any model of a physical process, such as without limitation heat transfer (thermo-), pore water movement (hydro-), concentration field (concentro or diffuso/convecto/advecto), stress and strain (mechano-), dynamics (dyno-), chemical reactions (chemo- or chemico-), electrostatics (electro-), neutronics (neutro-), magnetostatics (magneto-), and the like.

With continued reference to FIG. 6, in some embodiments, digital twin 600 may model, simulate, predict, and/or determine an aspect of aircraft 608 using machine-learning processes, including any machine-learning process described in this application. Digital twin 600 may include analytical models, for example those based upon known physical laws and phenomena, such as Newton's laws of motion. Alternatively and/or additionally, digital twin 600 may include data-driven models based largely on observed data, for example Monte-Carlo modeling and/or machine-learning processes. In some cases, digital twin 600 may be constituted of digital threads. According to some embodiments, a digital thread may be considered a lowest level design and specification for a digital representation of a physical item. Use of digital threads may, in some cases, ensure deep coherence between models of a digital twin 600. In some cases, a digital twin 600 may include a design equation and/or design matrix. A design equation may mathematically represent some or all design requirements and parameters associated with a particular design, for example an aircraft 608.

Figure 7:
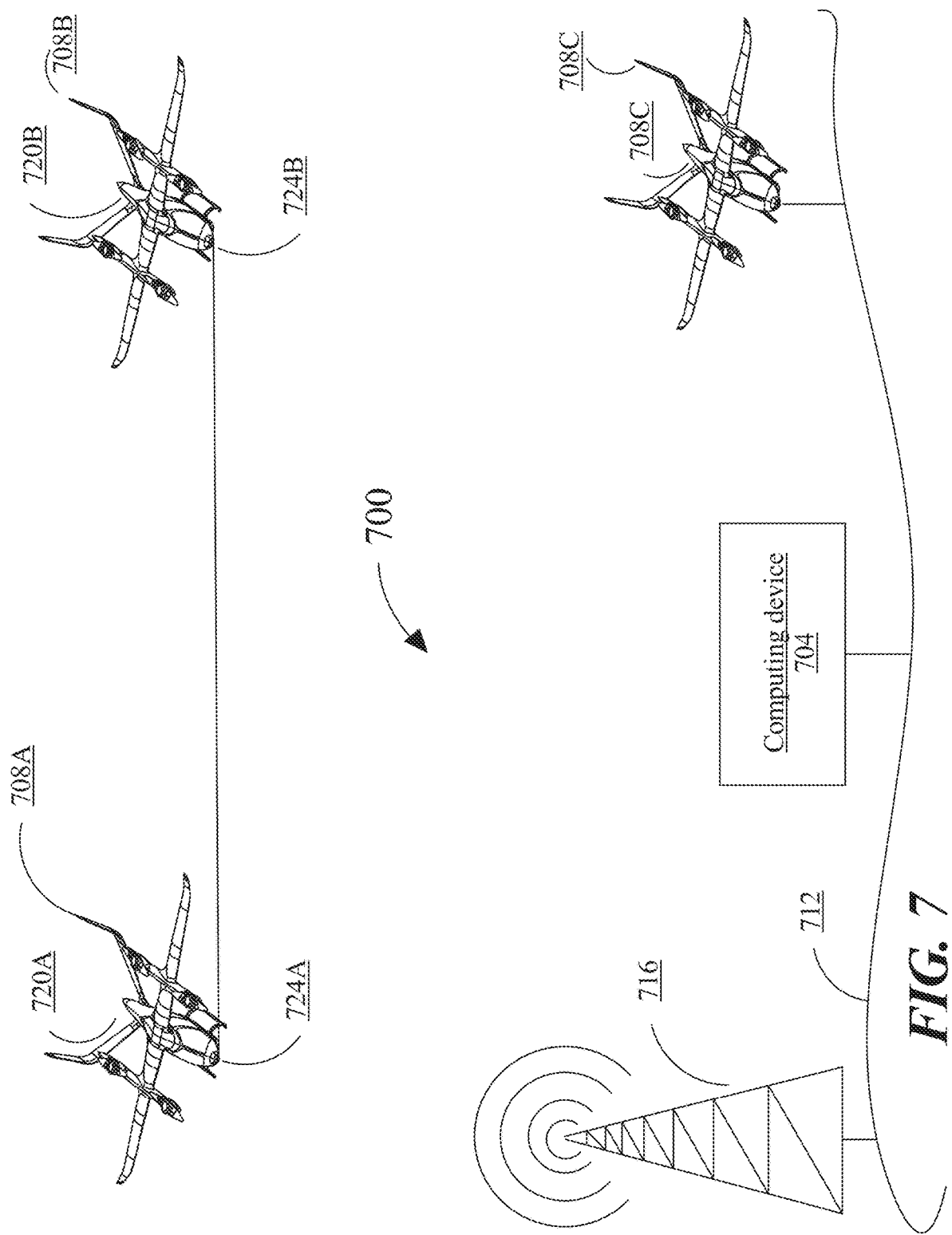
FIG. 7 is a block diagram of an exemplary avionic mesh network.

Referring to FIG. 7, an avionic mesh network 700 is schematically illustrated. According to some embodiments, an avionic mesh network may include a single network. Alternatively or additionally, an avionic mesh network may include more than a single network. A single networks may be differentiated according to address, for example Internet Protocol address, gateway, or name server used. For example, in some cases, multiple networks may use different gateways, even though the multiple networks may still be within communicative connection with one another.

With continued reference to FIG. 7, in some embodiments, an avionic mesh network 700 may include inter-aircraft network nodes, intra-aircraft network nodes, as well as non-aircraft network nodes. As used in this disclosure, a "network node" is any component communicatively coupled to at least a network. For example, a network node may include an endpoint, for example a computing device on network, a switch, a router, a bridge, and the like. A network node may include a redistribution point, for example a switch, or an endpoint, for example a component communicatively connected to network. As used in this disclosure, "inter-aircraft network nodes" are two or more network nodes that are physically located in two or more aircraft and communicatively connected by way of an inter-aircraft network. As used in this disclosure, "intra-aircraft network nodes" are two or more intra-aircraft network nodes that are each physically located within a single aircraft and communicatively connected. As used in this disclosure, a "non-aircraft network node" is a network node that is not located on an aircraft and is communicatively connected to a network.

With continued reference to FIG. 7, in some embodiments, avionic mesh network 700 may include a wireless mesh network organized in a mesh topology. A mesh topology may include a networked infrastructure in which network nodes may be connected directly, dynamically, and/or non-hierarchically to many other nodes (e.g., as many other nodes as possible). In some cases, a mesh topology may be facilitate cooperation between network nodes, for example redistributive network nodes, in routing of communication between network participants (e.g., other network nodes). A mesh topology may facilitate a lack of dependency on any given node, thereby allowing other nodes to participate in relaying communication. In some cases, mesh networks may dynamically self-organize and self-configure. Self-configuration enables dynamic distribution of workloads, particularly in event a network node failure, thereby contributing to fault-tolerance and reduced maintenance requirements. In some embodiments, mesh networks can relay messages using either a flooding technique or a routing technique. A flooding technique sends a message to every network node, flooding network with the message. A routing technique allows a mesh network to communicate a message is propagated along a determined nodal path to the message's intended destination. Message routing may be performed by mesh networks in part by ensuring that all nodal paths are available. Nodal path availability may be ensured by maintaining continuous nodal network connections and reconfiguring nodal paths with an occurrence of broken nodal paths. Reconfiguration of nodal paths, in some cases, may be performed by utilizing self-healing algorithms, such as without limitation Shortest Path Bridging. Self-healing allows a routing-based network to operate when a node fails or when a connection becomes unreliable. In some embodiments, a mesh network having all network nodes connected to each other may be termed a fully connected network. Fully connected wired networks have advantages of security and reliability. For example, an unreliable wired connection between two wired network nodes will only affect only two nodes attached to the unreliable wired connection.

With continued reference to FIG. 7, an exemplary avionic mesh network 700 is shown providing communicative connection between a computing device 704 and aircraft 708 A-C. Computing device 704 may include any computing device described in this disclosure. In some embodiments, computing device 704 may be connected to a terrestrial network 712. Terrestrial networks 712 may include any network described in this disclosure and may include, without limitation, wireless networks, local area networks (LANs), wide area networks (WANs), ethernet, Internet, mobile broadband, fiber optic communication, and the like. In some cases, a grounded aircraft 708 C may be connected to an avionic mesh network 700 by way of a terrestrial network 712. In some cases, avionic mesh network 700 may include a wireless communication node 716. A wireless communication node 716 may provide communicative connection by way of wireless networking. Wireless networking may include any wireless network method described in this disclosure, including without limitation Wi-Fi, mobile broadband, optical communication, radio communication, and the like. In some cases, wireless communication node 716 may be configured to connect with a first airborne aircraft 708 A in flight. First airborne aircraft in some embodiments may include at least a first intra-aircraft network node 720 A. As described above, first intra-aircraft network node 720 A may be configured to connect to other nodes within first airborne aircraft 708 A. In some cases, avionic mesh network 700 may be configured to provide inter-aircraft communication, for instance by using a first inter-aircraft network node 724 A. In some cases, first inter-aircraft network node may be configured to communicate with a second inter-aircraft network node 724 B. Inter-aircraft nodes 720 A-B may include radio communication and/or optical wireless communication, for example free space optical communication.

With continued reference to FIG. 7, avionic mesh network 700 may be additionally configured to provide for encrypted and/or secured communication between components, i.e., nodes, communicative on the network. In some cases, encrypted communication on network 700 may be provided for by way of end-to-end encryption. Exemplary non-limited end-to-end encryption methods include symmetric key encryption, asymmetric key encryption, public key encryption methods, private key encryption methods and the like. In some cases, avionic mesh network 700 and/or another network may be configured to provide secure key exchange for encryption methods. Exemplary non-limiting key exchange methods include Diffie-Hellman key exchange, Supersingular isogeny key exchange, use of at least a trusted key authority, password authenticated key agreement, forward secrecy, quantum key exchange, and the like. In some cases, an avionic mesh network 700 may include at least an optical network component, for example fiber optic cables, wireless optical networks, and/or free space optical network. In some cases, encrypted communication between network nodes may be implemented by way of optical network components. For example, quantum key exchange in some embodiments, may defeat man-in-the-middle attacks. This is generally because, observation of a quantum system disturbs the quantum system. Quantum key exchange in some cases, uses this general characteristic of quantum physics to communicate sensitive information, such as an encryption key, by encoding the sensitive information in polarization state of quantum of radiation. At least a polarization sensitive detector may be used to decode sensitive information.

Still referring to FIG. 7, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 7, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 7, in some cases, avionic mesh network 700 may be configured to allow message authentication between network nodes. In some cases, message authentication may include a property that a message has not been modified while in transit and that receiving party can verify source of the message. In some embodiments, message authentication may include us of message authentication codes (MACs), authenticated encryption (AE), and/or digital signature. Message authentication code, also known as digital authenticator, may be used as an integrity check based on a secret key shared by two parties to authenticate information transmitted between them. In some cases, a digital authenticator may use a cryptographic hash and/or an encryption algorithm.

Still referring to FIG. 7, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 7, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 7, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 7, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 7, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 7, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 7, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 7, as described above in some embodiments an avionic mesh network 700 may provide secure and/or encrypted communication at least in part by employing digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 7, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 7, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 8:
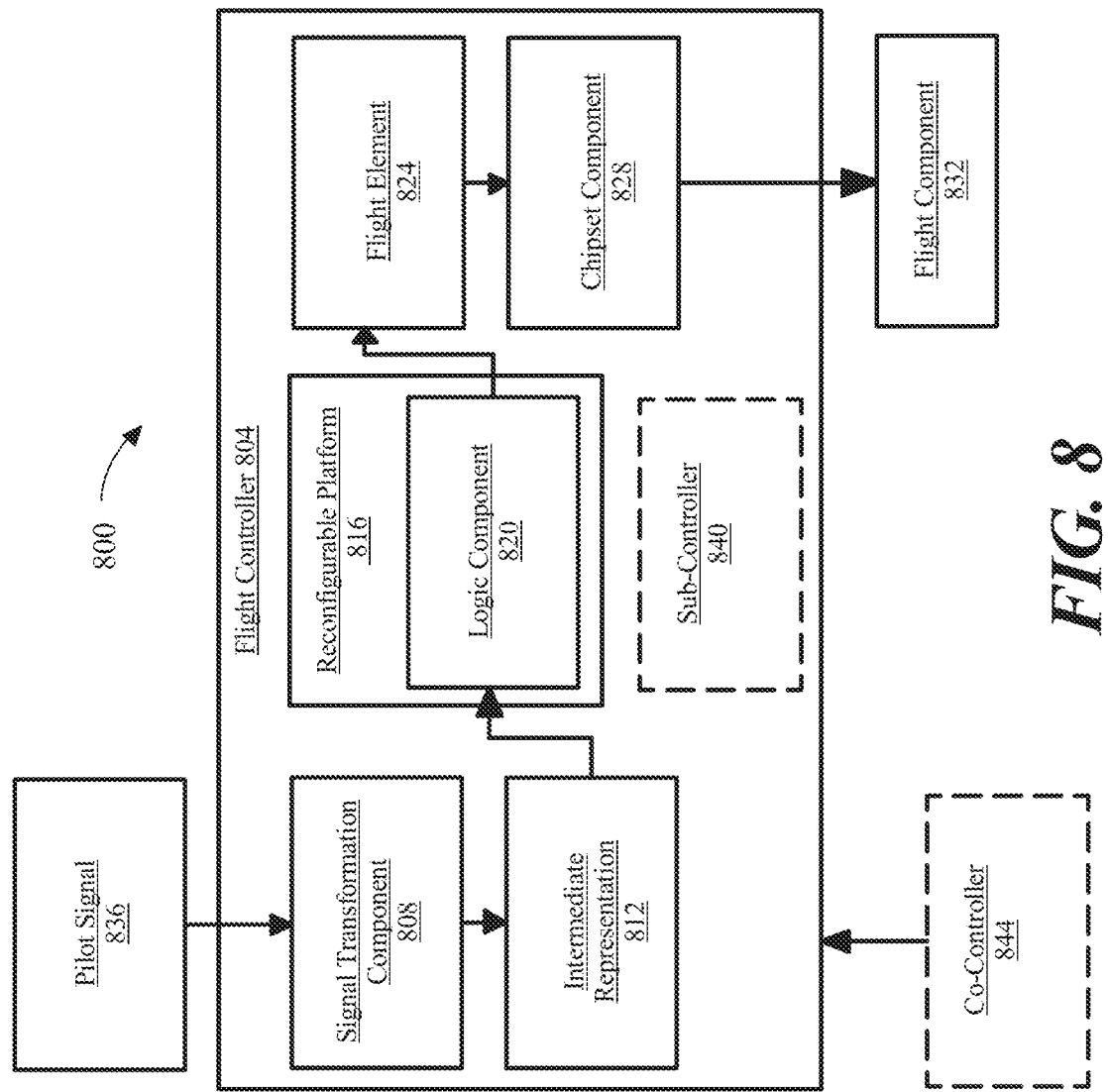
FIG. 8 is a block diagram of an exemplary flight controller.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 832 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
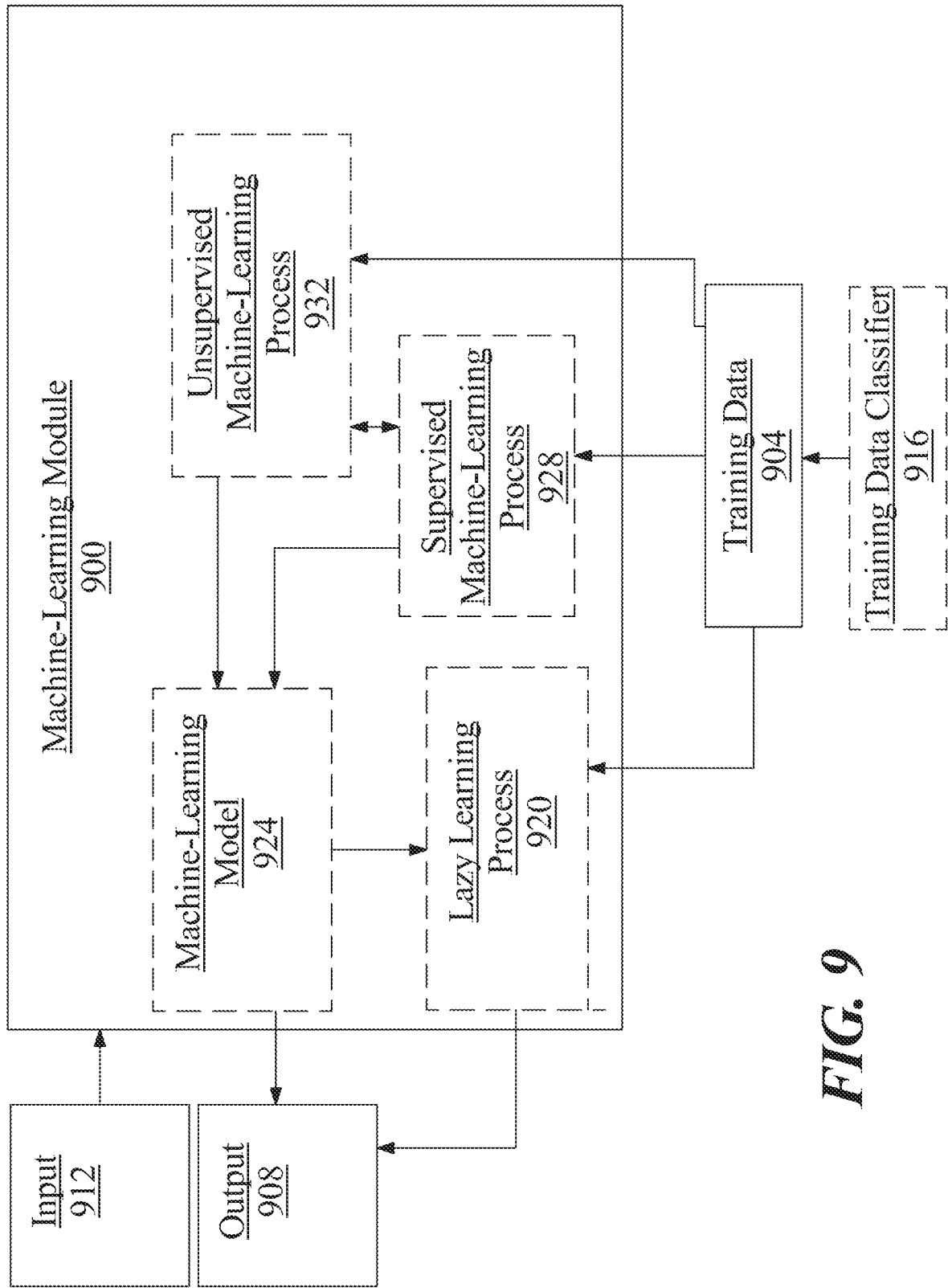
FIG. 9 is a block diagram of an exemplary machine-learning process.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example flight elements and/or pilot signals may be inputs, wherein an output may be an autonomous function.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 10:
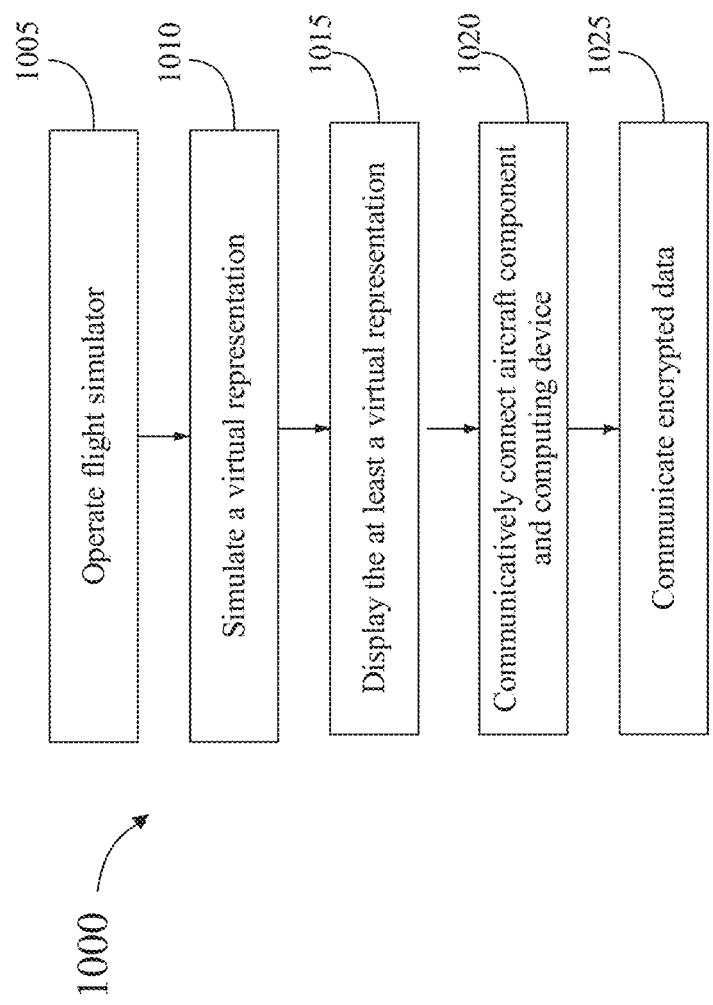
FIG. 10 is a flow diagram of an exemplary method of wrapping simulated intra-aircraft communication to a physical controller area network.

Referring now to FIG. 10, an exemplary augmented reality (AR) method 1000 of simulated operation of an electric vertical take-off and landing (eVTOL) aircraft is shown. At step 1005, a computing device may operate a flight simulator to simulate flight in an environment. Computing device may include any computing device described in this disclosure, including for example with reference to FIGS. 1-9 and 11. Flight simulator may include any flight simulator described in this disclosure, including for example with reference to FIGS. 1-9. Environment may include any environment described in this disclosure, including for example with reference to FIGS. 1-9.

Continuing with reference to FIG. 10, at step 1010, computing device may simulate at least a virtual representation interactive with flight simulator. At least a virtual representation may include an aircraft digital twin representing at least an aircraft component of an electric vertical take-off and landing (eVTOL) aircraft. At least a virtual representation may include any virtual representation described in this disclosure, for example with reference to FIGS. 1-9. An aircraft digital twin may include any digital twin described in this disclosure, including for example with reference to FIGS. 1-9. At least an aircraft component may include any aircraft component described in this disclosure, including for example with reference to FIGS. 1-9. eVTOL aircraft may include any virtual eVTOL aircraft described in this disclosure, including for example with reference to FIGS. 1-9. In embodiments, at least a virtual representation may include a virtual controller area network. In some embodiments, aircraft digital twin may include a flight controller model. In some embodiments, at least an aircraft component may include an eVTOL aircraft. eVTOL aircraft may include any eVTOL aircraft described in this disclosure, including for example with reference to FIGS. 1-9.

Continuing with reference to FIG. 10, at step 1015, a display communicatively connected to the computing device may display at least a virtual representation. Display may include any display described in this disclosure, for instance in reference to FIGS. 1-9 and 11.

Continuing with reference to FIG. 10, at step 1020, a mesh network may communicatively connect at least an aircraft component and computing device. Mesh network may include any network described in this disclosure, including for example with reference to FIGS. 1-9. At step 1025, mesh network may communicate encrypted data. Encrypted data may include any encrypted data described in this disclosure, including for example with reference to FIGS. 1-9. In some embodiments, mesh network may include an intra-aircraft network.

Still referring to FIG. 10, in some embodiments, method 1000 may additionally include transmitting, using computing device, encrypted data to at least an aircraft component. In some embodiments, method 1000 may additionally include receiving, using computing device, encrypted data from at least an aircraft component.

Still referring to FIG. 10, in some embodiments, method 1000 may additionally include performing, using a physical cockpit of a simulator module, at least a simulated flight mission; interfacing, using at least a pilot control of the simulator module, with a user; and detecting, using at least a sensor communicatively connected to computing device, a user interaction with the at least a pilot control. Simulator module may include any simulator module described in this disclosure, including for example with reference to FIGS. 1-9. Physical cockpit may include any physical cockpit described in this disclosure, including for example with reference to FIGS. 1-9. Pilot control may include any pilot control described in this disclosure, including for example with reference to FIGS. 1-9. At least a sensor may include any sensor described in this disclosure, for example with reference to FIGS. 1-9. In some cases, at least a virtual representation comprises a simulator digital twin of at least a portion of simulator module. Simulator digital twin may include any digital twin described in this disclosure, including for example with reference to FIGS. 1-9. In some cases, method 1000 additionally includes communicatively connecting, using mesh network, simulator module with the at least an aircraft component and computing device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
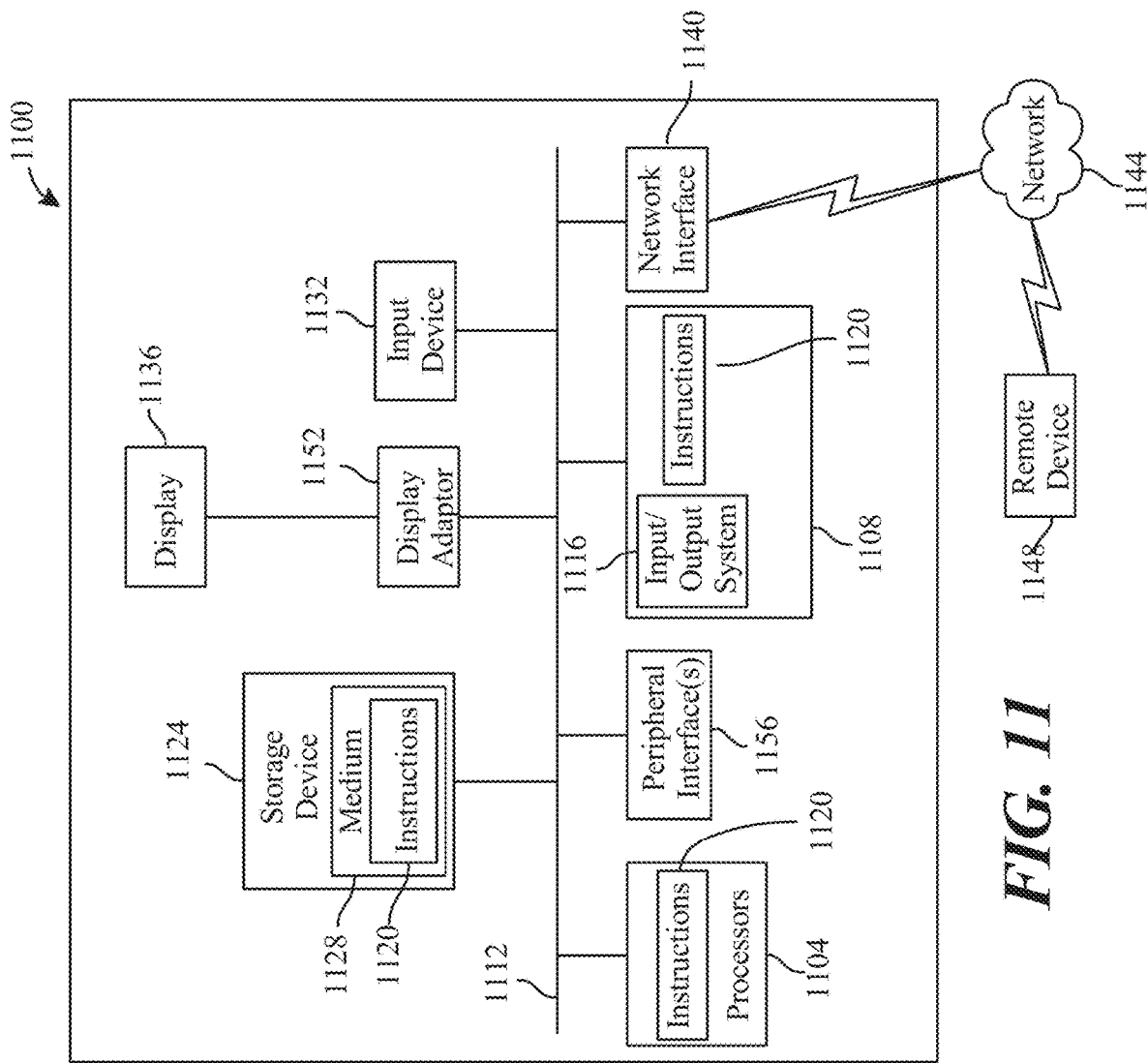
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display device 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for simulated operation of an electric aircraft, comprising:
    an aircraft component used in a class of the electric aircraft;
    a first computing device configured to:
        simulate flight in an environment; and
        perform a simulated flight mission using an aircraft digital twin representing a virtual simulation of the electric aircraft that uses the aircraft component, wherein:
            the aircraft digital twin comprises a battery model configured to predict battery performance data for a battery of the electric aircraft; and
            the simulated flight mission is based on the battery model and measured state data of the aircraft component;
    a physical network configured to:
        communicatively connect the aircraft component and the first computing device, and
        communicate data between the aircraft component and the first computing device, the data comprising the measured state data; and
    a second computing device configured to:
        receive state data obtained from the electric aircraft during operation of the electric aircraft, and
        iteratively update the aircraft digital twin based on the state data and the battery model.

2. The system of claim 1, wherein the aircraft digital twin comprises a sensor model.

3. The system of claim 1, wherein the aircraft digital twin comprises a thermal model.

4. The system of claim 1, wherein the aircraft digital twin comprises a flight controller model.

5. The system of claim 1, wherein the aircraft digital twin comprises a flight component model.

6. The system of claim 1, wherein the aircraft digital twin comprises a manufacturing model.

7. The system of claim 1, wherein the aircraft component comprises the electric aircraft.

8. The system of claim 1, further comprising:
a simulator module communicative with the first computing device and comprising:
a physical cockpit configured to be used for performing the simulated flight mission;
at least a pilot control configured to interface with a user; and
at least a sensor communicatively connected to the first computing device and configured to detect a user interaction with the pilot control.

9. The system of claim 8, wherein the virtual simulation comprises a simulator digital twin of at least a portion of the simulator module.

10. The system of claim 8, wherein the physical network is further configured to communicatively connect the simulator module with the aircraft component and the second computing device.

11. A method of simulated operation of an electric aircraft, comprising:
simulating, using a computing device, a flight of the electric aircraft in an environment;
communicatively connecting, using a physical network, the computing device and an aircraft component used in a class of the electric aircraft;
performing, using the computing device, a simulated flight mission using an aircraft digital twin representing a virtual simulation of the electric aircraft that uses the aircraft component, wherein the aircraft digital twin comprises a battery model configured to predict an energy efficiency of a battery of the electric aircraft, and wherein performing the simulated flight mission includes transmitting data between the aircraft component and the computing device over the physical network;
receiving state data obtained from the electric aircraft during operation of the electric aircraft; and
iteratively updating the aircraft digital twin based on the state data and the battery model.

12. The method of claim 11, wherein the aircraft digital twin comprises a sensor model.

13. The method of claim 12, the method further comprising:
performing, using a physical cockpit of a simulator module, the simulated flight mission;
interfacing, using at least a pilot control of the simulator module, with a user; and
detecting, using at least a sensor communicatively connected to the computing device, a user interaction with the pilot control.

14. The method of claim 13, wherein the virtual simulation comprises a simulator digital twin of at least a portion of the simulator module.

15. The method of claim 13, further comprising:
communicatively connecting, using the physical network, the simulator module with the aircraft component and the computing device.

16. The method of claim 11, wherein the aircraft digital twin comprises a thermal model.

17. The method of claim 11, wherein the aircraft digital twin comprises a flight controller model.

18. The method of claim 11, wherein the aircraft digital twin comprises a flight component model.

19. The method of claim 11, wherein the aircraft digital twin comprises a manufacturing model.

20. The method of claim 11, wherein the aircraft component comprises the electric aircraft.

* * * * *